United States Patent
Lastra et al.

(10) Patent No.: US 8,249,738 B2
(45) Date of Patent: Aug. 21, 2012

(54) DEVICE AND METHOD FOR DESIGNING A GARMENT

(75) Inventors: Juan José Lastra, Madrid (ES); Ramon Yepes, Majadahonda (ES)

(73) Assignee: Lectra SA (FR)

( * ) Notice: Subject to any disclaimer, the term of this patent is extended or adjusted under 35 U.S.C. 154(b) by 797 days.

(21) Appl. No.: 12/097,993

(22) PCT Filed: Dec. 19, 2006

(86) PCT No.: PCT/FR2006/051386
§ 371 (c)(1),
(2), (4) Date: Oct. 24, 2008

(87) PCT Pub. No.: WO2007/071880
PCT Pub. Date: Jun. 28, 2007

(65) Prior Publication Data
US 2009/0099683 A1    Apr. 16, 2009

(30) Foreign Application Priority Data
Dec. 19, 2005    (FR) ..................................... 05 12893

(51) Int. Cl.
*G06F 19/00*    (2011.01)

(52) U.S. Cl. ..................................................... 700/132
(58) Field of Classification Search .......... 700/130–133; 705/27.2
See application file for complete search history.

(56) References Cited

U.S. PATENT DOCUMENTS

| | | | |
|---|---|---|---|
| 4,916,634 A | 4/1990 | Collins | |
| 6,907,310 B2* | 6/2005 | Gardner et al. | 700/132 |
| 7,409,259 B2* | 8/2008 | Reyes Moreno | 700/132 |
| 2001/0026272 A1* | 10/2001 | Feld et al. | 345/419 |
| 2003/0011590 A1* | 1/2003 | Kung et al. | 345/419 |
| 2004/0049309 A1 | 3/2004 | Gardner et al. | |
| 2006/0015208 A1* | 1/2006 | Reyes Moreno | 700/132 |

FOREIGN PATENT DOCUMENTS
EP    1 595 465 A1    11/2005

\* cited by examiner

*Primary Examiner* — Nathan Durham
(74) *Attorney, Agent, or Firm* — Smith, Gambrell & Russell

(57) ABSTRACT

The invention relates to a system and a method for the computer-aided design of a garment occupying a virtual surface represented by data stored in a memory of a computer including the following steps: generating base patterns on said virtual surface, adding at least one style effect on at least one base pattern transforming said at least one base pattern into at least one stylized base pattern, and forming a stylized virtual surface.

24 Claims, 14 Drawing Sheets

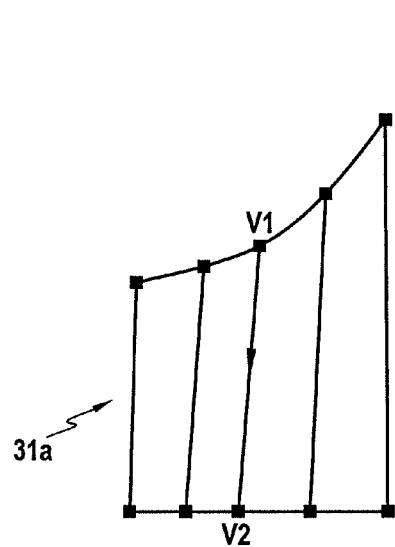
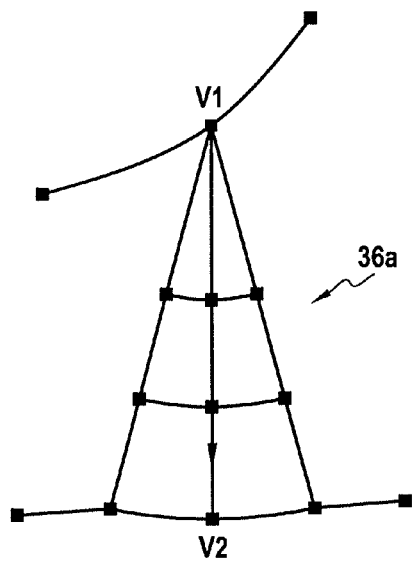
FIG.6A                FIG.6B
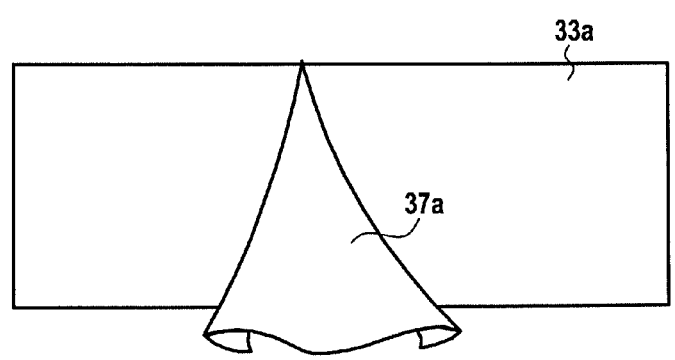
FIG.6C

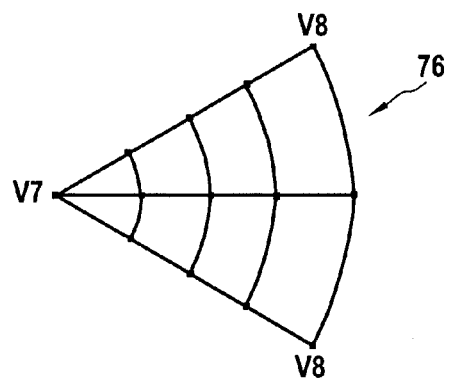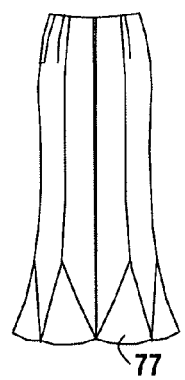
FIG.13A  FIG.13B
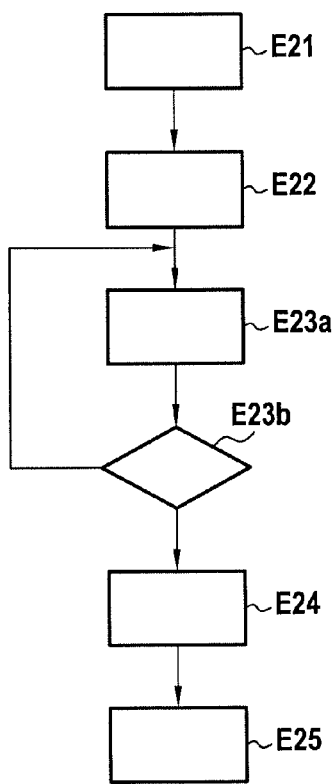
FIG.14

DEVICE AND METHOD FOR DESIGNING A GARMENT

TECHNICAL FIELD OF THE INVENTION

The invention relates to the field of the computer-aided design (CAD) of a garment, and is used in particular in the clothing or sewing industries. More specifically, the invention describes a method and a device for the computer-aided design of garments comprising style effects.

BACKGROUND OF THE INVENTION

Currently, the computer-aided design of a garment is limited to the definition of patterns on a smooth surface which represents the surface of the garment surrounding a virtual mannequin and the laying-flat of the three-dimensional (3D) surfaces which are created against a two-dimensional (2D) surface.

FIG. 17 illustrates the various steps for the computer design of a garment according to the prior art.

In a first step E101, there is loaded into the computer a virtual garment surface 111 which may be a virtual mannequin or any other surface representing a skirt, trousers, sleeves, etc. The virtual garment surface 111 can be defined by a set of measures and parameters promoting freedom of movement, as well as by the basic shape of the garment.

Then, in step E102, stitch lines 115 are defined on this virtual surface 111 to create three-dimensional patterns 113a. These patterns 113a are created exclusively by drawing design or stitch lines 115 on the virtual surface 111 of the garment. Thus, the resulting three-dimensional patterns 113a are the various regions of the virtual surface 111 delimited by these stitch lines 115.

Subsequently, in step E103, the flat patterns 113c corresponding to the three-dimensional patterns 113a are calculated automatically by a laying-flat method.

A laying-flat method is described for example by B. K. Hinds et al. in the article <<Interactive garment design>> published in 1990, in The Visual Computer (6) pages 53-61.

The main advantage to be used for the clothing industry of a three-dimensional-type computer-aided design (CAD) is the assurance that the flat patterns 113c resulting from the laying-flat operation are capable of clothing the shape and the volume of a model or of a human body and that the existing relationships between the three-dimensional patterns 113a forming the garment are automatically maintained.

However, these methods place stringent limitations on the nature of the flat clothing patterns 113c. Indeed, the patterns calculated by the laying-flat methods are not capable of reproducing the same constraints as those defined by pattern designers or patterners.

Moreover, these methods use above all geometric or topological criteria and do not take into account the properties of the fabric or the style properties commonly used by patterners.

Furthermore, in these methods, the three-dimensional patterns are represented by lining surfaces of the virtual base surface. Indeed, the three-dimensional patterns are defined by cut-out or stitch lines limiting closed regions on the virtual base surface. Thus, the three-dimensional patterns are limited to being sub-surfaces of the virtual base surface.

BRIEF SUMMARY OF THE INVENTION

The present invention relates to a method for the computer-aided design of a garment occupying a virtual surface represented by data stored in a memory of a computer, including the following steps:

generating base patterns on said virtual surface,
adding at least one style effect on at least one base pattern transforming said at least one base pattern into at least one stylised base pattern, and
forming a stylised virtual surface; the addition of a style effect on a base pattern includes the insertion of a given supplementary surface into a given section of said base pattern, said base pattern corresponding to a closed arc path of a planar graph associated with said virtual surface, and said given section corresponding to a pair of vertices pertaining to said planar graph.

This method allows the incorporation of style effects such as flares, flounces, gores, pleats or gathers on a three-dimensional or two-dimensional virtual surface in a natural manner by expressing it directly on the virtual surface of the garment. Thus, a broad range of base patterns can be achieved in a simple manner in such a way that flat patterns generated from the stylised virtual surface automatically and inherently include these style effects. Indeed, the know-how of patterners consisting in accommodating the flat patterns in accordance with the final desired shape of the garment is introduced from the computer design of the garment.

Moreover, the style effect can be incorporated on the virtual surface in a simple and precise manner and allows a volume effect to be introduced on this virtual surface of the garment.

Advantageously, the method includes an elimination, a replacement, or a modification of at least one style effect on a stylised base pattern by an elimination, a replacement, or a modification of said given supplementary surface.

Thus, at least one style effect among the style effects incorporated on the virtual surface can be eliminated, replaced or modified at any moment. This allows a broad range of models of garments or a plurality of variations of a single garment model to be generated in a simple manner.

According to one aspect of the present invention, the given supplementary surface and the given section are represented by a set of parameters.

Thus, a user such as a patterner can interact directly and in his own language to give values to this set of parameters to define the shape or the properties of the style effect or if appropriate to modify this style effect.

According to one embodiment, the set of parameters can be defined in a declarative manner allowing a resolution means to carry out the necessary calculations for the insertion of said given supplementary surface.

Thus, according to this embodiment of the method, there must merely be specified a set of constraints defining the shape of the style effect and the geometric details satisfying these constraints are calculated automatically in such a way that the user does not have to intervene in the calculation process. This allows the generic production of a plurality of garment models.

According to another embodiment, the set of parameters is defined in a procedural manner based on a flow chart indicating step-by-step the progress of the insertion of the given supplementary surface.

Thus, according to this second embodiment of the method, the user checks the calculation procedure allowing a broad range of garment models to be produced precisely.

Advantageously, the method includes a test validating the insertion of the given supplementary surface on said virtual surface.

Thus, the validation test allows the given supplementary surface to be adjusted appropriately on the virtual surface and the parameters associated with this insertion optionally to be corrected. This improves the quality of the design of the garment.

Furthermore, the method includes a variation of said set of parameters to find the appropriate parameters for passing said validation test.

Thus, it is possible to select the parameters required in order further to improve the quality of the design of the garment.

Advantageously, said given section is selected from a set of sections comprising a dart section, an internal section, and an I-shaped section.

Thus, a single supplementary surface can be inserted in a plurality of ways producing a plurality of style effects.

Advantageously, said given supplementary surface is selected from a set of supplementary surfaces comprising a dart surface, a flare surface, a flounce surface, a gore surface, a pleat surface, and a gathered surface.

Thus, the method allows a broad range of style effects to be produced.

According to a preferred embodiment, the base patterns are three-dimensional base patterns defined by stitch lines on said virtual surface and said at least one stylised base pattern is a three-dimensional stylised base pattern defined on said stylised virtual surface.

Thus, three-dimensional style effects are produced directly on three-dimensional patterns.

Advantageously, after the formation of said stylised virtual surface, the method includes laying said three-dimensional base patterns flat to form flat patterns reproducing said stylised virtual surface.

Thus, the style effect is automatically reproduced on flat patterns which are directly suitable for an industrial design of the garment.

The invention also relates to a device for designing a garment occupying a virtual surface represented by data stored in storage means, characterised in that it comprises processing means, for:
  generating base patterns on said virtual surface,
  adding at least one style effect on at least one base pattern
    transforming said at least one base pattern into at least one stylised base pattern, and
    forming a stylised virtual surface.

Said processing means add a style effect on a base pattern by inserting a given supplementary surface into a given section of said base pattern.

Advantageously, said processing means select said given supplementary surface from a pre-established supplementary surfaces database comprising dart surfaces, flare surfaces, flounce surfaces, gore surfaces, pleat surfaces, and gathered surfaces.

Furthermore, said processing means select said given section from a pre-established database of given sections comprising dart sections, internal sections, and I-shaped sections.

The base patterns are three-dimensional base patterns defined by stitch lines on said virtual surface and said at least one stylised base pattern is a three-dimensional stylised base pattern defined on said stylised virtual surface.

Said processing means are furthermore intended to form flat patterns capable of reproducing said stylised virtual surface by laying said three-dimensional base patterns flat.

The invention also relates to a device for producing garment items, comprising:
  a device for designing a garment according to the foregoing characteristics,
  cutting means for cutting out garment items based on the flat patterns, and
  means for transmitting data between the design device and the cutting means.

The invention also relates to a computer program including coded instructions for carrying out a method according to the foregoing characteristics.

The invention also relates to a data medium which is readable by a computer system, including data or instructions for carrying out a method according to the foregoing characteristics.

BRIEF DESCRIPTION OF THE DRAWINGS

Other particularities and advantages of the invention will become apparent on reading the description given hereinafter by way of non-limiting example with reference to the appended drawings, in which:

FIGS. 6A to 13B illustrate a plurality of examples of the addition of a three-dimensional style effect on a three-dimensional virtual surface;

FIG. 14 is a flow chart illustrating an example of the design of a garment represented by a three-dimensional virtual surface by means of the device from FIG. 1;

DETAILED DESCRIPTION OF THE EMBODIMENTS

Generally speaking, the design of a garment starts with a sketch drawn by a stylist illustrating the model of the garment to be produced.

Subsequently, the patterners design the actual geometric shapes of the patterns and also the dimensions thereof in accordance with the various sizes of the garment. Thus, the patterner creates a block or base pattern which is most suitable for the model of the garment to be designed.

A base pattern is an initial or intermediate pattern, the shape of which is used at all times for the design of the garments. The base pattern is generally designed for an average-sized body of a target population.

The patterner is very adept at making the necessary modifications or transformations to the base patterns to obtain the model of the desired garment. For example, the patterner can modify the shape or the dimensions of a base pattern to attain the targeted model. A set of base patterns will be deemed to be suitable if the volume produced by the assembly of this set is suitable to clothe an average-sized human body.

Once the base patterns have been finalised, other elements concerning for example notches, reserves for stitching, or complementary parts such as pockets or cuffs are added to the base patterns.

Subsequently, the base patterns are graded by giving the length and width proportions to these base patterns in accordance with a grading table sequentially defining the various sizes of the garment.

Then, these base patterns are cut and joined together to produce an actual model of the garment. If appropriate, during this step, the base patterns can be modified in order to improve the style or the adjustment of the model on the body before commencing industrial production of the garment.

Figure 1:
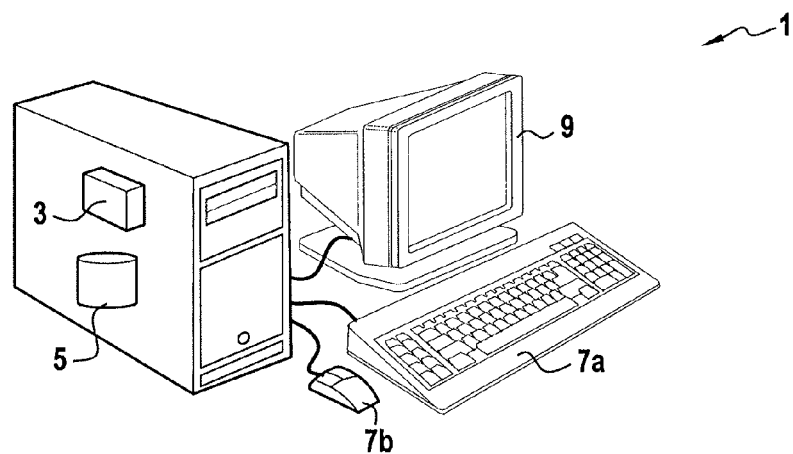
FIG. 1 illustrates a device for the automated design of a garment, according to the invention.

FIG. 1 illustrates a device 1 for the automated design of a garment, according to the invention. This device 1 is for example a computer or a computer system usually comprising processing means 3, memories or storage means 5, input peripherals (keyboard 7a, mouse 7b, disks, etc.) and output peripherals (display means 9, printer, disks, etc.).

The garment to be designed occupies a virtual surface represented by data which can be stored in the storage means 5.

The processing means 3 are intended to process, using a computer program, structured data provided at the input of the device or computer system 1 in order automatically to produce a stylised virtual surface by generating base patterns on the virtual surface of the garment, and by adding at least one style effect on at least one base pattern.

The computer program including the coded instructions carrying out the method for the design of the garment according to the invention can be stored in the storage means 5 or in a data medium which can be read by the design device or computer system 1.

Figure 2:
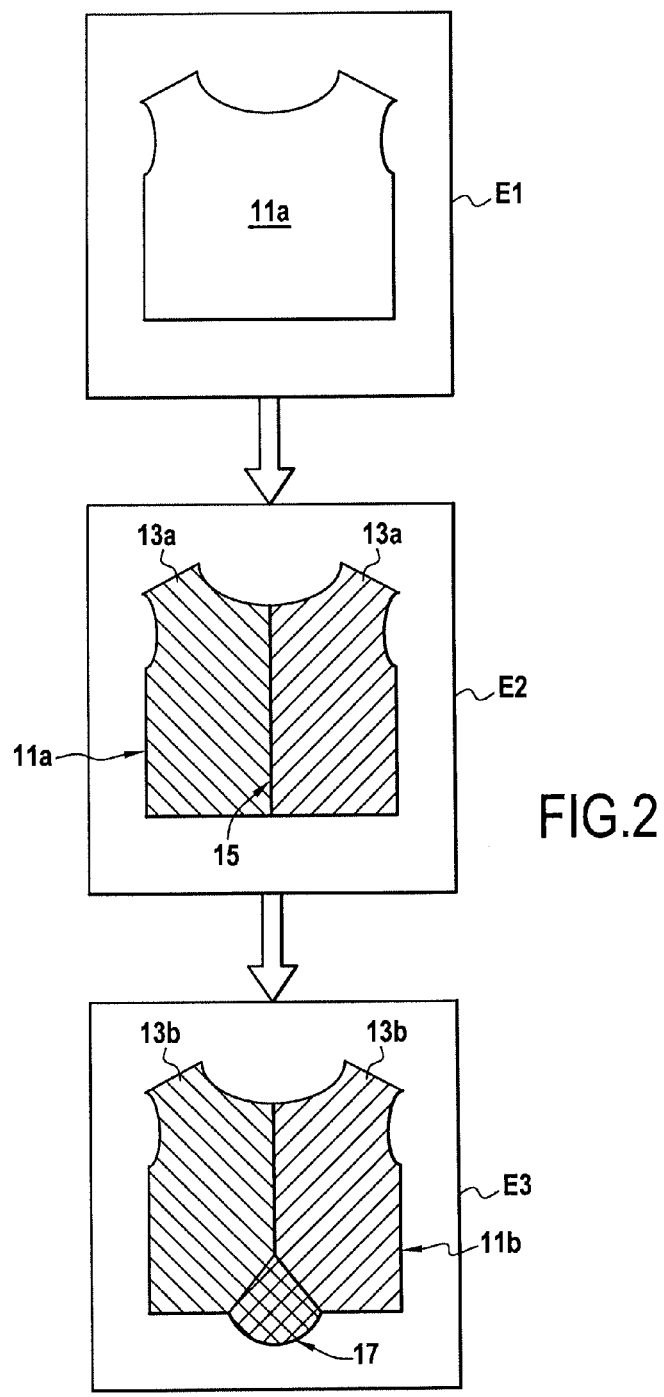
FIG. 2 is an example illustrating the various steps of designing the garment by means of the device from FIG. 1.

Indeed, FIG. 2 is an example illustrating the various steps for designing the garment by means of the device 1 from FIG. 1.

In a first step E1, a virtual surface 11a occupied by a garment is constructed in a known manner. This virtual surface 11a can be a virtual mannequin or any other surface representing a blouse, a skirt, a pair of trousers, sleeves, etc. Thus, the virtual surface 11a is a computer-generated representation of the garment which can be described parametrically or by a triangular mesh. The virtual surface 11a can therefore be represented by digital data stored in the storage means 5 of the design device 1 (the computer or the computer system).

Subsequently, in step E2, base patterns 13a are generated on the virtual surface 11a by defining stitch lines 15 on this virtual surface 11a.

Figure 3:
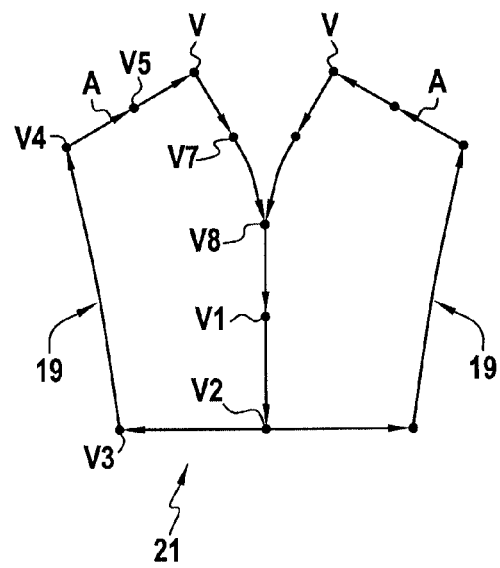
FIG. 3 is an example illustrating a planar graph associated with the virtual surface of a garment, according to the invention.

A base pattern 13a can be defined by a face having a non-zero bounded surface on the virtual surface 11a and corresponding to a closed arc path 19 of a planar graph 21 associated with the virtual surface 11a, as illustrated in FIG. 3.

It will be noted that a graph G=(V, E) is composed of two sets, the set of edges E and the set of vertices V. Thus, a closed path 19 is an ordered series of vertices V1, . . . , V8, V1 joined together by oriented edges or arcs A and which has as its last vertex the first vertex V1. Furthermore, a graph is said to be planar if there is at least one way to draw the graph on a plane without two edges intersecting.

Thus, a base pattern 13a is a face having a non-zero bounded surface on the virtual surface 11a defined as an image of a closed path 19 pertaining to a planar graph 21. In other words, the planar graph 21 is a pre-image of the base pattern.

In step E3, at least one style effect 17 is added on at least one base pattern 13a transforming the base pattern into a stylised base pattern 13b.

Thus, by transforming the initial virtual surface 11a by adding one or more style effects 17 on the base pattern or patterns 13a, a stylised virtual surface 11b is formed.

Figure 4:
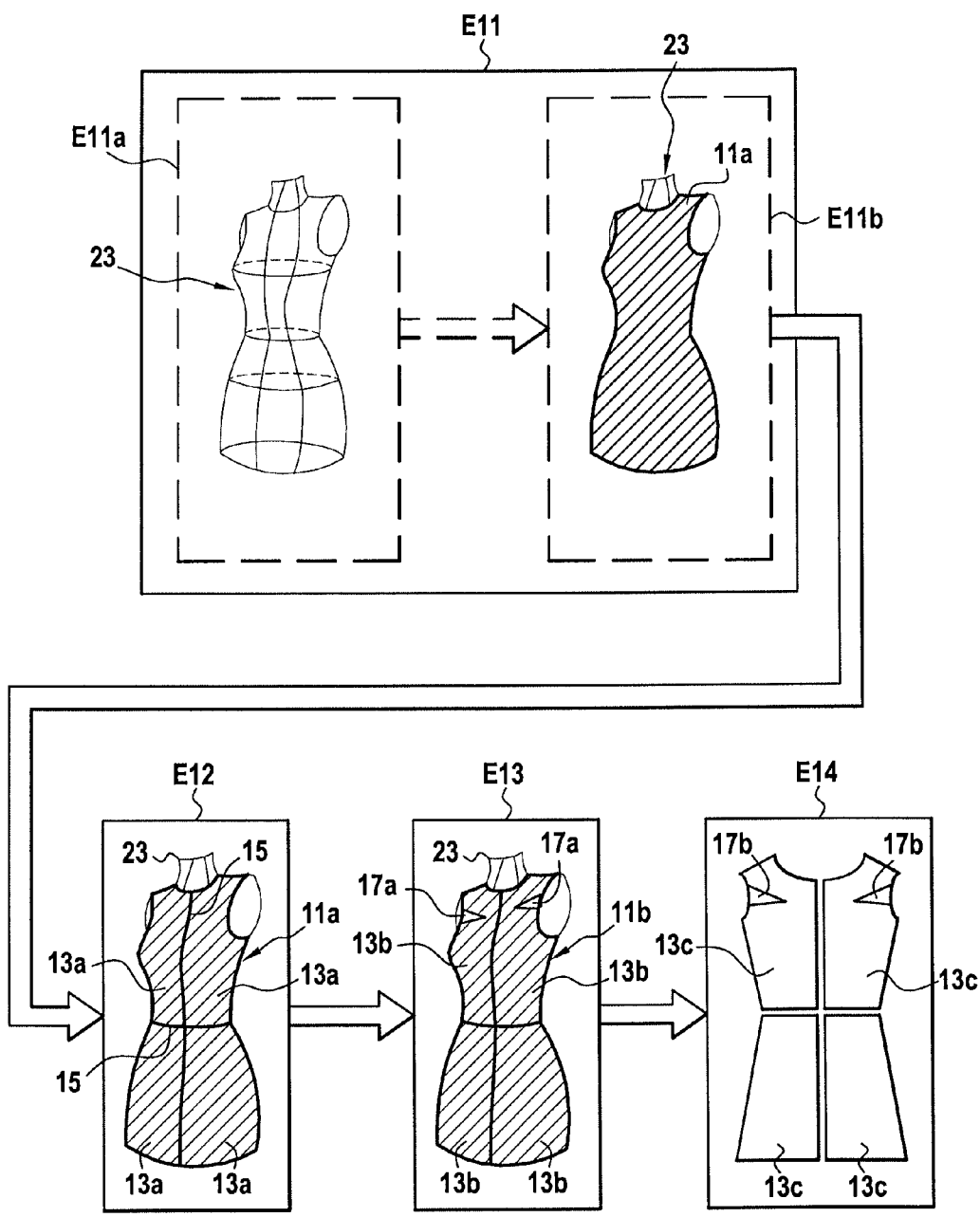
FIG. 4 is an example illustrating the various steps for the 3D design of a garment by means of the device from FIG. 1.

More specifically, FIG. 4 illustrates the various steps for the 3D design of a garment by means of the design device 1 from FIG. 1.

In step E11 the three-dimensional virtual surface 11a occupied by the garment is constructed in a known manner.

By way of example, to construct this three-dimensional virtual surface 11a, a virtual mannequin 23 is first constructed in 3D in step E11a. The virtual mannequin 23 is a computer-generated representation of the volume (or of the useful portion of the volume) of a clothing mannequin or of a human body. By way of example, the virtual mannequin 23 can be described by a parametric outer surface or by a triangular mesh.

The virtual mannequin 23 can therefore be represented by digital data stored in the storage means 5 of the computer or of the computer system 1, this data corresponding for example to the outer parametric surface of the virtual mannequin 23.

Various types of virtual mannequins 23 can be defined, as a function of various parameters, for example the age or the sex of the person whom the mannequin represents. In particular, a <<mannequins>> database can initially be defined, from which the patterner or a user can select a particular mannequin, as required. Such a database can be stored beforehand in the storage means 5 of the computer system 1.

Then, in step E11b, the three-dimensional virtual surface 11a of the garment is constructed by defining the gaps between this three-dimensional virtual surface 11a and the surface of the mannequin 23.

Thus, the three-dimensional virtual surface 11a of the garment is a sub-set of the three-dimensional Euclidean space occupied by the garment. By way of example, it is a parametric surface S in $R^3$ defined by an application X on a domain D in $R^2$ (i.e. $X: D \in R^2 \rightarrow S \in R^3$). The domain D corresponds to a simply related surface which is homeomorphic to a disc.

Subsequently, in step E12, three-dimensional base patterns 13a are generated on the three-dimensional virtual surface 11a by defining des stitch lines 15 on this three-dimensional virtual surface 11a.

In the same way as described hereinbefore, a three-dimensional base pattern 13a can be defined by a face having a non-zero bounded surface on the three-dimensional virtual surface 11a and corresponding to a closed arc path 19 A of a planar graph 19 associated with the three-dimensional virtual surface 11a (see FIG. 3).

Thus, a three-dimensional base pattern 13a denoted by P is a face having a non-zero bounded surface on the parametric surface S (three-dimensional virtual surface 11a) and which can be defined by the image in accordance with the application X of a closed path of the planar graph G pertaining to the domain D (i.e. P=X(G)).

In step E13, the user acts on the three-dimensional base patterns 13a via the computer system 1 to add directly a three-dimensional style effect 17a on at least one three-dimensional base pattern 13a transforming said three-dimensional base pattern into a three-dimensional stylised base pattern 13b. In this example, the style effects 17a are darts modeled by triangular parts added to sections located on the rims of the shoulders of the three-dimensional base patterns 13a of a straight dress.

Thus, the user or the patterner interacts with the computer system 1 to introduce, in his own language, the style effects 17a on the garment by indicating the particular values of a set of parameters concerning each style effect and the positioning thereof on the garment.

Then, by transforming the initial three-dimensional virtual surface 11a by adding one or more style effects 17a on the three-dimensional base pattern or patterns 13a, a three-dimensional stylised virtual surface 11b is formed.

In step E14, the computer system 1 automatically calculates, using a known laying-flat method, the flat patterns 13c corresponding to the three-dimensional stylised virtual surface 11b. Thus, the laying-flat automatically generates the most appropriate two-dimensional style effect 17b to reproduce the three-dimensional style effect 17a on the stylised virtual surface 11b.

It will be noted that a three-dimensional style effect 17a in the region of a three-dimensional base pattern 13a can be added by inserting a given supplementary surface into a given section of the base pattern 13a. The given supplementary surface can be selected from a set of supplementary surfaces comprising a dart surface, a flare surface, a flounce surface, a gore surface, a pleat surface, or a gathered surface.

The supplementary surfaces are represented by digital data stored in the storage means 5 of the computer or of the computer system 1, this data corresponding for example to the outer parametric surface of these surfaces.

Furthermore, the given supplementary surface as well as the given section can be represented by a set of parameters defined in a declarative manner or in a procedural manner.

Moreover, it will be noted that the insertion of a given supplementary surface is a non-isometric transformation. Indeed, the supplementary surface is a volume modifier which provides the final garment with volume effects. This category of transformations provides a very varied set of style effects.

FIGS. 5A to 5E illustrate in greater detail steps E13 and E14 from the example of FIG. 4.

Figure 5A:
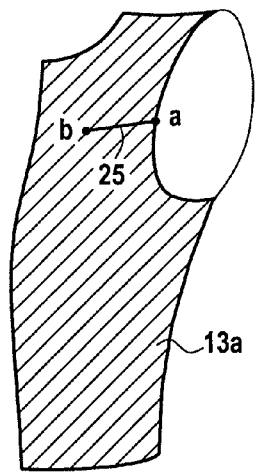
FIGS. 5A to 5E illustrate in greater detail certain steps from the example of FIG. 4.

Indeed, FIG. 5A illustrates the three-dimensional base pattern 13a corresponding to the right-hand side of the upper portion of the straight dress.

The addition of the three-dimensional style effect 17a on the base pattern 13a of the three-dimensional virtual surface 11a includes the insertion of a supplementary triangular-shaped surface on the given section 25 between the points <<a>> and <<b>> of the base pattern 13a.

In this particular example, the addition of the style effect 17a corresponds to a dart creating a volume effect on the three-dimensional virtual surface 11a describing the straight dress.

Figure 5B:
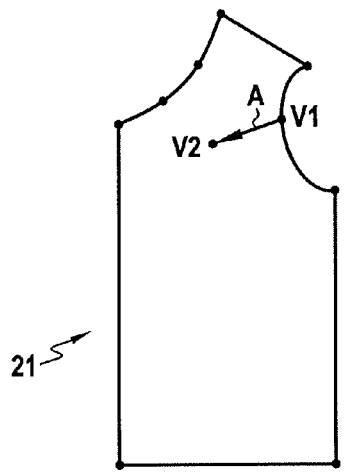

FIG. 5B shows that the given section 25 corresponds to an ordered pair of vertices V1 and V2 pertaining to the planar graph 21 associated with the base pattern 13a. The vertex V1 corresponds to the point <<a>> and the vertex V2 corresponds to the point <<b>>.

Indeed, FIG. 5B illustrates the planar graph 21 describing the pre-image (in accordance with the application X) of the base pattern 13a and comprising the pair of vertices V1 and V2 describing the pre-image of the given section 25 of the base pattern 13a. In other words, the given section 25 is a three-dimensional section corresponding to the image on the parametric surface S (three-dimensional base pattern 13a) by the application X, of an arc A pertaining to the planar graph 21.

In the example of FIGS. 5A and 5B, the given section 25 is therefore a dart section defined by the image in accordance with the application X of the pair of vertices V1 and V2 of degrees <<3>> and <<1>> respectively. Indeed, the vertex V1 is an extremity of three arcs, whereas the vertex V2, which is an internal point, is an extremity of a single arc.

It will be noted that this given section 25 (dart section) can be defined by position parameters indicating the positioning of the insertion of the dart on the three-dimensional base pattern 13a.

Figure 5C:
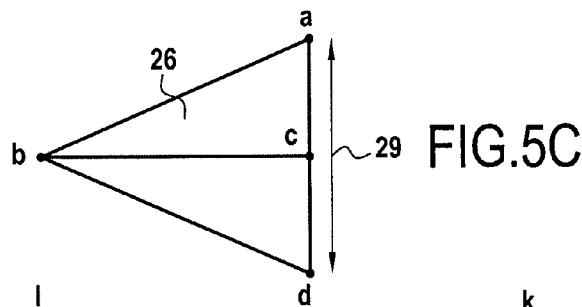

Moreover, FIG. 5C illustrates the planar graph 26 of a supplementary surface representing a dart part modeled by two triangles <<abc>> and <<cbd>>. The dart part is defined by an opening parameter including a positive actual value defining the length 29 of the arc of the free portion of the dart.

Figure 5D:
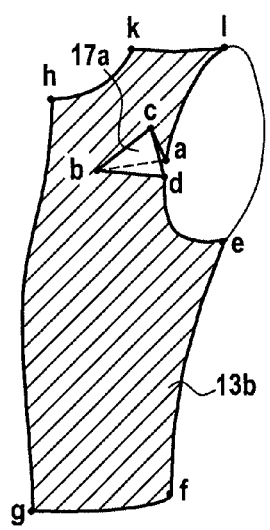

Furthermore, FIG. 5D shows the addition of the style effect 17a defined in this example by a 3D triangle folded along the given three-dimensional section 25 between the point <<b>> inside the three-dimensional base pattern 13b and the point <<a>> on the rim of the three-dimensional base pattern 13a. In this example, the three-dimensional base pattern 13b is limited by the closed path <<e,f,g,h,k,l,a,e>>. It will be noted that the points <<a>> and <<d>> are superimposed on the three-dimensional base pattern 13b and that the 3D triangle (indicated by the two triangles <<abc>> and <<cbd>>) which models the dart does not pertain to the smooth surface of the three-dimensional base pattern 13b.

Figure 5E:
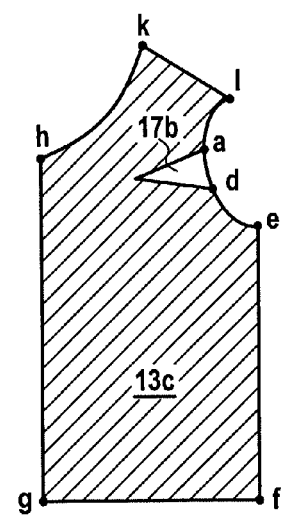

FIG. 5E corresponding to step E14 from FIG. 4 shows that the two triangles <<abc>> and <<cbd>> are flattened and thus form a plane dart 17b like all the other regions of the plane base pattern 13c limited by the closed path <<e,f,g,h,k,l,a,d,e>>. In this case, the two points <<a>> and <<d>>, which formed a single point before the flattening, are now separated by a distance equal to the sum of the sides <<ac>> and <<ad>> of the two triangles <<abc>> and <<cbd>>, the value of which corresponds to the desired opening of the dart.

In order to insert the dart part into the dart section 25, the processing means 3 of the computer system 1 builds a triangulation (mesh) of the dart part and calculates the two-dimensional position corresponding to each vertex of the planar graph 27 of this dart part. Similarly, the processing means 3 calculates the three-dimensional positions of the points of the three-dimensional dart 17a corresponding to the images of the vertices of the planar graph 27 of the dart part.

FIGS. 6A to 13B illustrate other examples of the addition of a three-dimensional style effect on a three-dimensional virtual surface. Obviously, the same examples can be applied for the addition of a two-dimensional style effect on a two-dimensional virtual surface.

Figure 7A:
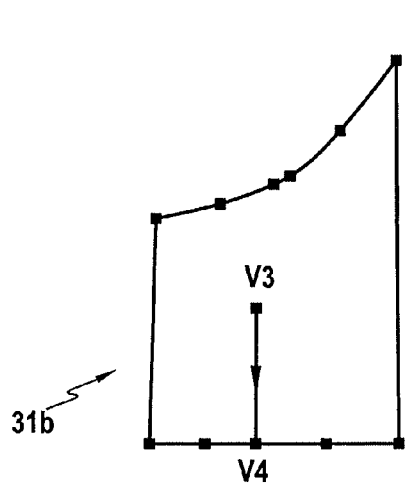
Figure 7B:
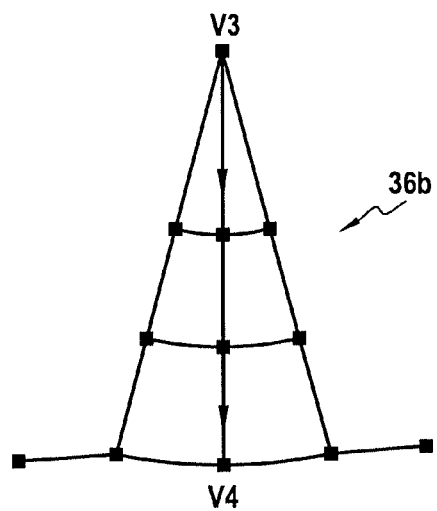
Figure 7C:
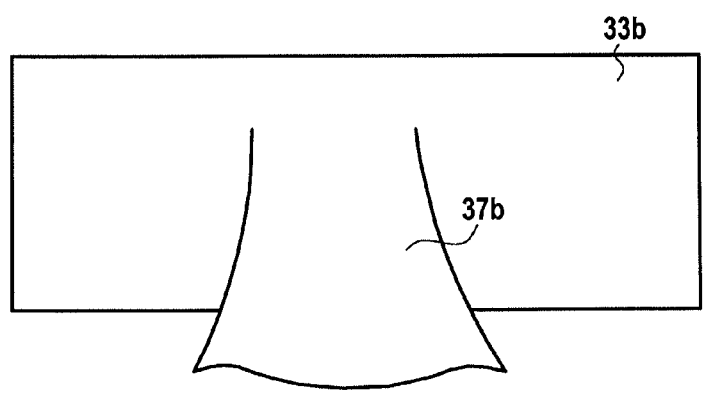

Each of FIGS. 6C and 7C illustrates an example of the addition of a flare-type (or spread-type) style effect 37a, 37b on a three-dimensional base pattern 33a, 33b of a three-dimensional virtual surface. A flare is a triangular-shaped volume modifier which can be inserted along a dart section or an <<I-shaped section>> of the three-dimensional base pattern 33a, 33b to provide the garment with a volume or freedom-of-movement effect.

Indeed, FIG. 6A illustrates the planar graph 31a associated with the base pattern 33a and comprising an ordered pair of vertices V1 and V2 corresponding to an I-shaped section.

The I-shaped section is a three-dimensional section which can be defined by the image in accordance with the application X of a pair of vertices V1 and V2 of degrees greater than or equal to three. In the example of FIG. 6A, each of the vertices V1 and V2 is of degree three.

Moreover, FIG. 7A illustrates the planar graph 31b associated with the base pattern 33b comprising a pair of vertices V3 and V4 corresponding to a dart section (see FIG. 5B).

Depending on the nature of the given section, a flare may be a complete flare 37a or a half-flare 37b. If the given section is an I-shaped section, then the flare is classed as a complete flare 37a. On the other hand, if the given section is a dart section, then the flare is classed as a half-flare 37b.

The given section (dart section or I-shaped section) can be defined by position parameters indicating the positioning of the insertion of the supplementary surface representing the flare 37a, 37b on the base pattern 33a, 33b. The computer system 1 allows automatic switchover between the two types of flare depending on the nature of the given section.

FIG. 6B illustrates the planar graph 36a of a complete flare part inserted between the two vertices V1 and V2 corresponding to the I-shaped section. Moreover, FIG. 6C illustrates the insertion of the complete flare 37a along the I-shaped section of the base pattern 33a.

Similarly, FIG. 7B illustrates the planar graph 36b of a supplementary surface of a half-flare inserted between the vertices V3 and V4 corresponding to the dart section and FIG. 7C illustrates the insertion of the half-flare 37b along the dart section of the base pattern 33b.

In the two cases, the part or the supplementary flare surface is defined by a set of parameters comprising an opening parameter, a reverse parameter, and a display parameter.

The opening parameter comprises a positive actual value defining the length of the arc of the free portion of the flare surface 37a, 37b.

The reverse parameter is a binary value (<<true>> or <<false>>) indicating the starting extremity of the flare surface. This value defines the extremity of the given section at which the open or wide portion of the flare surface is inserted. If the reverse value is <<false>>, then the vertex of the flare cone is inserted at the starting extremity (corresponding to the vertex V1 or V3) of the given section, whereas the wide portion of the flare surface is inserted at the final extremity (corresponding to the vertex V2 or V4) of the given section. On the other hand, if the reverse value is <<true>>, then the vertex of the flare cone is inserted at the final extremity (corresponding to the vertex V2 or V4) of the given section, whereas the wide portion of the flare surface is inserted at the starting extremity (corresponding to the vertex V1 or V3) of the given section. Thus, the reverse value defines the orientation of the flare cone.

The display parameter takes its value from a binary set comprising the data <<inside>> and <<outside>> indicating whether the flare 37a, 37b is displayed toward the inside or outside relative to the base pattern 33a, 33b.

FIGS. 8A to 8F illustrate certain examples of use of the flare effect.

Figure 8A:
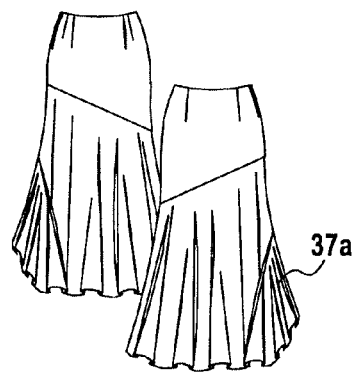
Figure 8B:
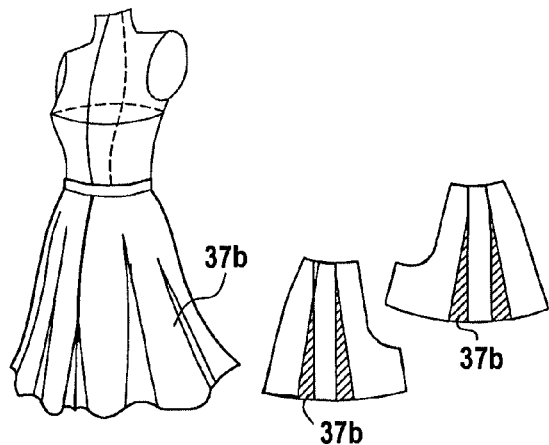

FIG. 8A illustrates an asymmetric skirt comprising triangular-shaped flares 37a on the lower portion thereof. Similarly, FIG. 8B illustrates a flounced divided skirt comprising triangular-shaped half-flares 37b on the lower portion thereof.

Figure 8C:
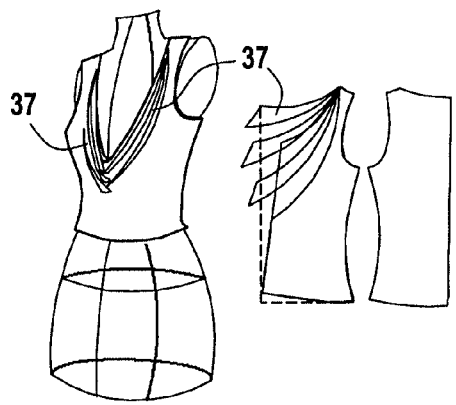

FIG. 8C illustrates a draped blouse comprising flares 37 in the neck region. In this case, the flares 37 are triangular shapes with curved sides.

Figure 8D:
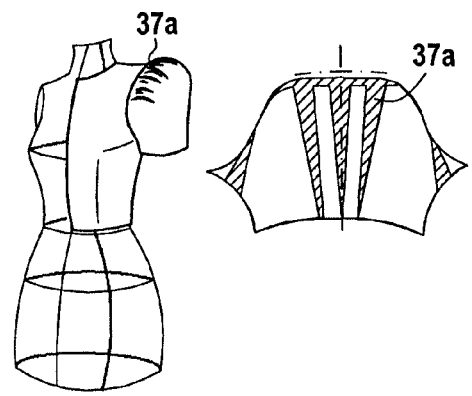
Figure 8E:
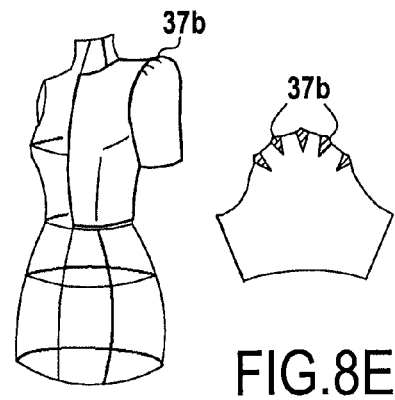
Figure 8F:
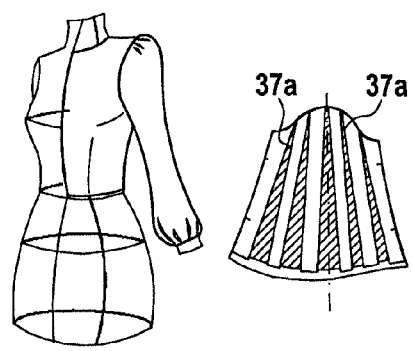

FIGS. 8D to 8F illustrate a plurality of types of sleeves comprising flares. FIG. 8D illustrates a waisted sleeve having in the shoulder region an arc length elongated by the insertion of triangular shapes forming complete flares 37a.

FIG. 8E illustrates a half-flare-type transformation 37b created by the insertion of the small triangles introducing freedom of movement of the sleeve in the shoulder region.

FIG. 8F illustrates a sleeve comprising complete flares 37a by the insertion of the triangular shapes, thus forming a bell effect on one extremity of the sleeve.

FIGS. 9A to 9E illustrate examples of the addition of a pleat-type style effect 47a, 47b on a three-dimensional virtual surface. A pleat is a rectangular-shaped volume modifier which can be inserted along an I-shaped section of a base pattern 43a, 43b to provide a volume or style effect. The surface of the pleat forms part of the stylised base pattern, i.e. it is integrated into the surface of the base pattern 43a.

There are two types of pleats depending on the shape thereof and the use thereof. The first is a <<normal pleat>> 47a having a trapezoidal shape used for a surface insertion or which can be folded and sewn on one side of a base pattern. For a normal pleat 47a, the width of the pleat is defined as half the width of the portion inserted into the base pattern 43a.

The second type of pleat is the <<hollow or round face-type pleat>> (faced pleat) defined by three longitudinal strips. The parameters defining this type of pleat include the width of the pleat as well as the width of the central strip.

Figure 9A:
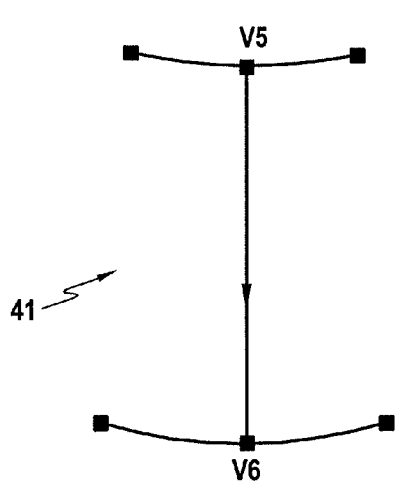

FIG. 9A illustrates the planar graph 41 associated with a base pattern 43a, 43b and comprising an ordered pair of vertices V5 and V6 corresponding to an I-shaped section (see also FIG. 6A). The I-shaped section can be defined by position parameters indicating the positioning of the insertion of the pleat on the base pattern 43a, 43b.

Figure 9B:
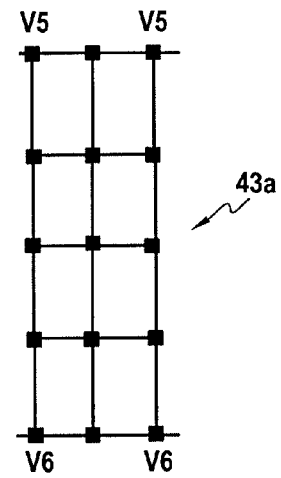
Figure 9C:
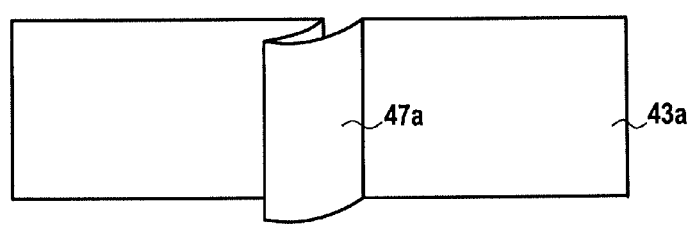

FIG. 9B illustrates the planar graph 43a of a part or supplementary surface of a normal pleat and FIG. 9C illustrates the insertion of the normal pleat 47a into the base pattern 43a.

Figure 9D:
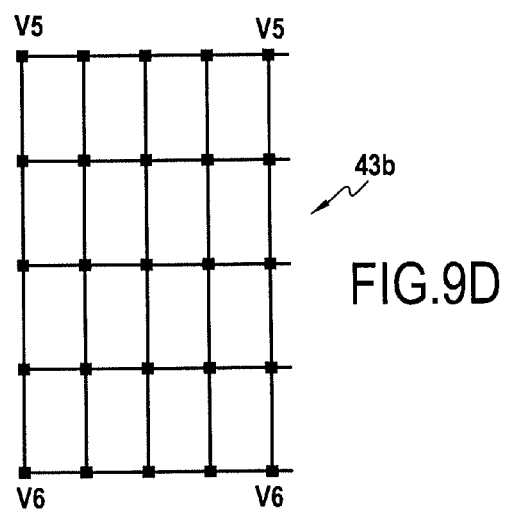
Figure 9E:
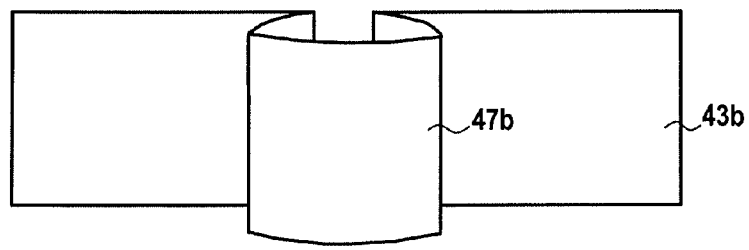

Moreover, FIG. 9D illustrates the planar graph 43b of a part of a faced pleat and FIG. 9E illustrates the insertion of the faced pleat 47b into the base pattern 43b.

The supplementary surfaces of the normal pleat 47a or faced pleat 47b can be defined by a set of parameters comprising a begin width parameter, an end width parameter, a pleating-type parameter, a reverse parameter, and a display parameter.

The begin width parameter comprises a positive actual value defining the width of the front portion of the pleat 47a, 47b on the beginning extremity thereof. The end width parameter comprises a positive actual value defining the width of the front portion of the pleat 47a, 47b on the final extremity thereof.

The pleating-type parameter indicates whether the pleat is of the normal 47a or faced 47b type. The reverse parameter is a binary value (<<true>> or <<false>>) indicating which is the starting extremity on the I-shaped section.

The example from FIG. 9A shows that the vertices V5 and V6 are the extremities of an arc oriented in the direction V5, V6 (i.e. that V5 is the starting vertex and V6 is the end vertex). Thus, if the reverse value is <<false>>, then the <<beginning>> and <<end>> of the width of the supplementary pleat surface are inserted between the starting vertex V5 and end vertex V6 respectively. On the other hand, if the reverse value is <<true>>, then the insertion is inverted in such a way that the <<beginning>> and <<end>> of the width of the supplementary pleat surface are inserted between the vertices V6 and V5 respectively.

The display parameter takes its value from a binary set comprising the data <<inside>> and <<outside>> indicating whether the pleat 47a, 47b is displayed toward the inside or outside relative to the base pattern 43a, 43b.

Figure 10A:
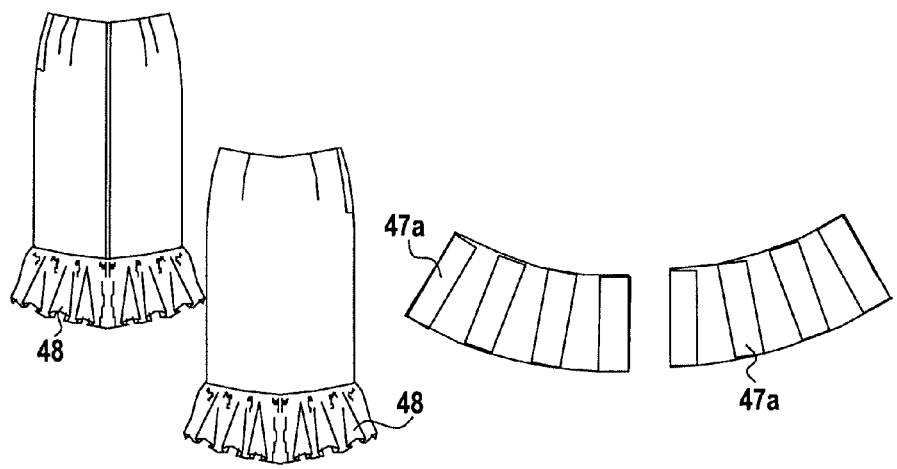
Figure 10B:
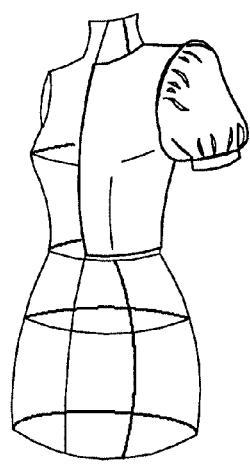
Figure 10C:
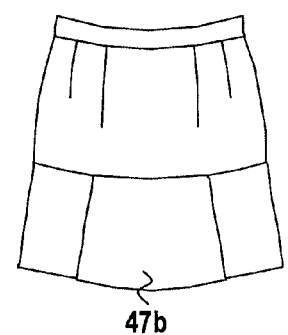

FIGS. 10A to 10C illustrate certain examples of transformations by a pleat effect.

FIG. 10A illustrates a skirt comprising trapezoidal-shaped flounces 48 on the lower portion thereof. This is a normal pleat 47a-type transformation, the pleat of which is held at one of its extremities on the lower rim of the skirt.

Similarly, FIG. 10B illustrates a billowing sleeve which is gathered at the armhole and the balloon effect of which is generated by a normal pleat-type transformation in which trapezoidal-shaped regions are inserted between the section in the shoulder region and that in the arm region.

FIG. 10C illustrates a straight skirt with a round pleat (faced pleat) 47b formed by two pleats layered in opposite directions. Similarly, hollow pleats can be formed by rim-to-rim meeting and at the location of the base pattern of two folds forming between them a hollow.

Figure 11:
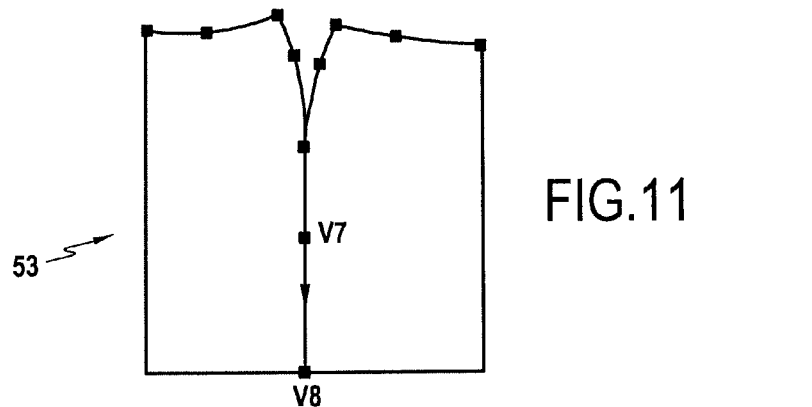

It will be noted that if a rectangular shape (see the planar graph 43b from FIG. 9D) is inserted along a rim of a section between two base patterns (see FIG. 11) and not along an I-shaped section, then a half-pleat is obtained. Indeed, FIG. 11 illustrates a planar graph 53 comprising an ordered pair of vertices V7 and V8 corresponding to a section between two base patterns. Thus, a half-pleat-type style effect is formed if the planar graph of a supplementary rectangular surface (see FIG. 9D) is inserted between the pair of vertices V7 and V8 of the planar graph 53.

A half-pleat can be defined by a set of parameters comprising a position parameter (point on section), a width parameter, an extreme parameter, and a display parameter.

The position parameter indicates the position of the point corresponding to the vertex V7 and the portion of the section at which the half-pleat must be inserted.

The width parameter comprises an actual value defining the width of the front portion of the half-pleat.

The display parameter takes its value from a binary set comprising the data <<inside>> and <<outside>> indicating whether the pleat is displayed toward the inside or outside relative to the base pattern.

Figures 12A, 12B:
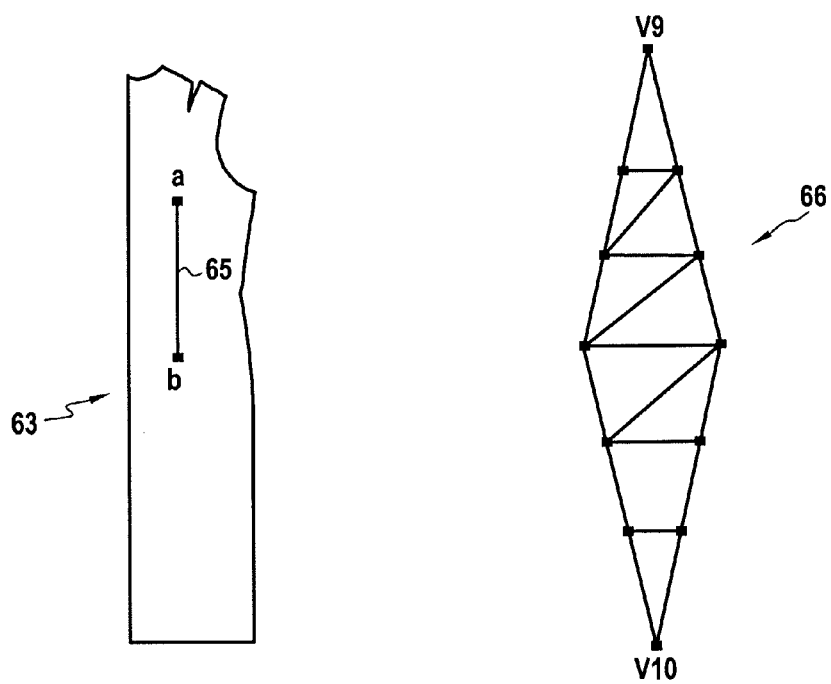

FIGS. 12A and 12B illustrate an example of the addition of an internal dart-type style effect on a three-dimensional virtual surface. An internal dart is a volume modifier having the shape of a diamond which can be inserted along a <<dart section>> 65 of a base pattern 63 to accommodate the garment on the body. It is often used in the belt region to draw in the waist of dresses or blouses.

FIG. 12A illustrates the base pattern 63 comprising the internal dart section 65 and FIG. 12B illustrates the planar graph 66 of a part having the shape of a diamond or supplementary surface of an internal dart.

The internal dart section 65 is a 3D section which can be defined by the image in accordance with the application X of a pair of internal vertices of degrees equal to one.

An internal dart allows the opening in the supplementary surface represented by a diamond to be forced, during the laying-flat of the base pattern 63, on the plane without introducing holes.

An internal dart can be defined by a set of parameters comprising a section parameter, a width parameter, and a display parameter.

The section parameter defines the section 65 on the base pattern 63 at which the diamond must be introduced. The width parameter comprises an actual value defining the width of the diamond or of the internal dart in the middle region thereof.

The display parameter takes its value from a binary set comprising the data <<inside>> and <<outside>> indicating whether the internal dart is displayed toward the inside or outside relative to the base pattern.

FIGS. 13A and 13B illustrate an example of the addition of a 3D style effect corresponding to a gore 77 by inserting a given supplementary surface on a given section common to two base patterns of a three-dimensional virtual surface.

Indeed, FIG. 13A illustrates the planar graph 76 of a gore part 77 which can be inserted between the ordered vertices V7 and V8 of the planar graph illustrated in FIG. 11 and corresponding to the given section between two base patterns. A gore part 77 corresponds to a sector of a disc, the circular portion of which is free and the rims of which coincide with the given section between the two base patterns.

A gore part 77 can be defined by a set of parameters comprising for example an opening parameter, a display parameter, a position parameter (point on section) and an extreme parameter.

The opening parameter comprises an actual value defining the length of the arc of the circular portion of the gore.

The display parameter takes its value from a binary set comprising the data <<inside>> and <<outside>> indicating whether the gore is inserted or displayed toward the inside or toward the outside of the virtual surface of the garment.

The <<position>> parameter indicates the position of the vertex V7 of the planar graph 76 of the gore 77 relative to the given section defined by the vertices V7 and V8 (see FIG. 11) between the two base patterns.

The extreme parameter takes its value from a binary set comprising the <<beginning>> and <<end>> data relative to the vertex of the cone of the gore. If the value of the extremity is <<beginning>>, then the vertex of the cone of the gore is attached to the upper extremity of the given common section between the two base patterns (corresponding to the starting vertex V7 from FIG. 11). On the other hand, if the value of the extremity is <<end>>, then the vertex of the cone of the gore is attached to the end extremity (corresponding to the vertex V8 from FIG. 11) of the given section.

In order to model the gore part, the computer system calculates the two-dimensional position of each vertex of the planar graph 76 of the gore as well as the three-dimensional position of the corresponding points of the gore 3D. Moreover, it is possible to build a triangulation (mesh) by refining the mesh by creating more vertices inside the planar graph 76 of the part of the gore 77 by inserting spokes from the vertex V7 up to the arc of the circle of the planar graph 76.

More specifically, having calculated the positions of the vertices of the planar graph 76 of the gore, the positions thereof on the gore 3D are calculated. In order to do this, the vertices V7 and V8 of each side of the planar graph 76 of the gore 77 have merely to be matched with the corresponding portion of the 3D section between the two 3D base patterns at which the gore must be inserted. All of the other vertices will then correspond to the inner or outer portion of the 3D virtual surface while preserving their mutual distances. FIG. 13B illustrates an example of the insertion of external gores 77 on the lower portion of a skirt which then produces a volume effect.

FIG. 14 is a flow chart illustrating an example of the design on the computer or computer system 1 of a garment represented by a three-dimensional virtual surface 11a.

In a first step E21, the three-dimensional virtual surface 11a occupied by the garment is constructed.

Subsequently, in step E22 the three-dimensional base patterns 13a are generated on the three-dimensional virtual surface 11a by defining stitch lines 15 on this three-dimensional virtual surface 11a.

In step E23a, a set of parameters is edited or defined allowing insertion, replacement, modification or elimination of a given supplementary surface or a given corresponding section on a three-dimensional base pattern to introduce, replace, modify, or eliminate a style effect 17 on the three-dimensional virtual surface 11a or the stylised virtual surface 11b.

Each given surface and its corresponding given section are defined by a set of parameters corresponding to the desired style effect.

This set of parameters can be defined in a procedural manner based on a flow chart which indicates step-by-step the progress of the insertion, or if appropriate the replacement, the modification or the elimination of the given supplementary surface.

In a variation, the set of parameters can be defined in a declarative manner allowing a <<solver>> resolution means to carry out the necessary calculations for the insertion, or if appropriate the replacement, the modification or the elimination of the given supplementary surface.

Step E23b is a test validating the insertion of the given supplementary surface on the virtual surface 11a according to given validation rules to check appropriate adjustment of the given supplementary surface on the virtual surface 11a. If appropriate, the validation test allows the replacement, the modification or the elimination of the given supplementary surface on the virtual surface 11a to be checked.

If the result of the test is negative, step E23a is returned to, to re-edit or vary the set of parameters in order to find the appropriate parameters for passing the validation test.

On the other hand, if the result of the test is positive, i.e. if the supplementary surface is well adjusted, or if appropriate the replacement, the modification or the elimination of the supplementary surface is carried out effectively, step E24 is proceeded to.

Step E24 involves the laying-flat of the stylised virtual surface which automatically generates the two-dimensional style effects 17b on the flat patterns 13c corresponding to the three-dimensional style effects 17a on the three-dimensional patterns of the stylised virtual surface 11b.

If appropriate, in step E25, the flat base patterns 13c are graded before being cut and joined together to produce actual models of the garment.

Figure 15:
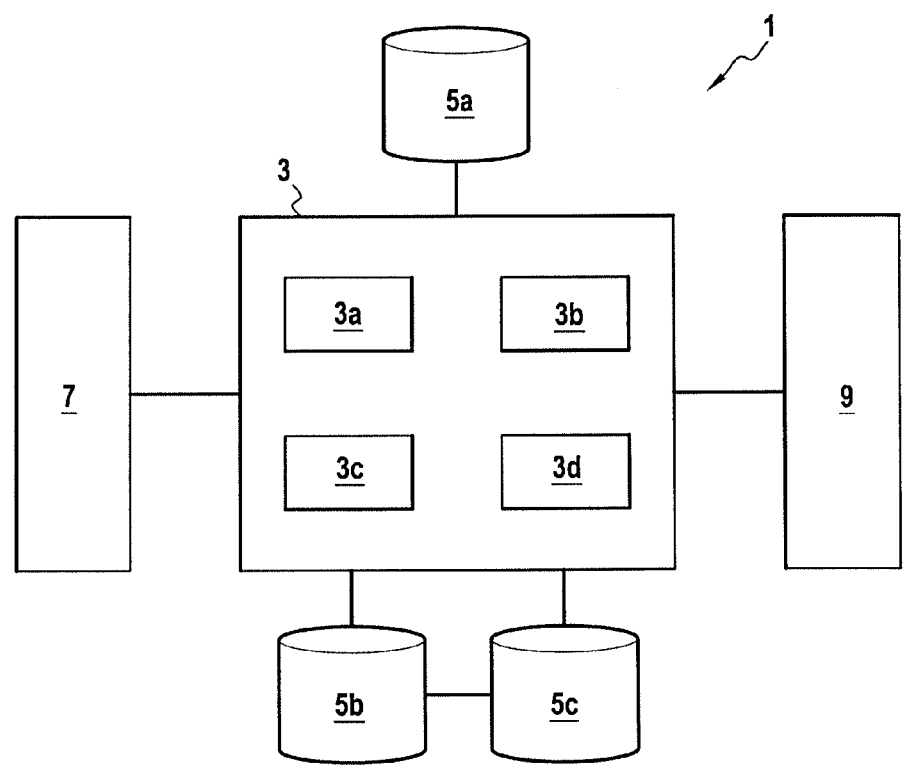
FIG. 15 illustrates a highly schematic example of the device from FIG. 1.

FIG. 15 illustrates a highly schematic example of the computer system 1 carrying out the method according to the invention.

In this example, the computer system 1 comprises a processing means 3 (comprising the means 3a, 3b, 3c and 3d), storage means 5a, 5b, 5c, input peripherals 7 and output peripherals 9.

The means 3a comprise a basic three-dimensional geometric modeling software package allowing the creation of 3D surfaces or articles by the description of their parameters or characteristics.

The means 3b comprise a software package or a program according to the invention allowing modeling of the 3D style effects by the description of their parameters.

The means 3c can comprise parametric or variational modeling means and a constraint resolution means allowing geometric calculations to be carried out.

Finally, the means 3d can comprise a style effect recognition software package.

Moreover, the storage means 5a can comprise extensible databases of all the types of 2D or 3D style effects which can be incorporated into any garment model. Thus, it can comprise a <<supplementary surfaces>> database comprising dart surfaces, flare surfaces, flounce surfaces, gore surfaces, pleat surfaces, and gathered surfaces. It can also comprise a <<given sections>> database comprising dart sections, internal sections, and I-shaped sections.

Thus, this storage means 5a can comprise all the knowledge necessary to add each style effect on any particular garment model, including the parameters which the user must specify to add the style effect (for example, the width and the length of a dart) and the validation rules to which the style effect must adhere in order for this effect to be validated.

The storage means 5b can comprise a <<style effect models>> database and the storage means 5c can comprise a basic <<geometric article models>> database (garment, mannequin, etc. virtual surfaces).

The user interacts via the input peripherals 7 with the style effect model displayed on the output peripherals 9 causing the necessary geometric modifications to be carried out automatically by the means 3b for modeling the 3D style effects in interaction with the other means of the computer system 1.

Thus, generally speaking, the processing means 3 are intended to select a given supplementary surface and a given section for inserting the given supplementary surface into the given section of a base pattern in order to add a style effect requested by a user.

Then, the user or the patterner can display the three-dimensional base patterns on a screen. He can select a style effect in order to add it to a base pattern, analysed the overall impression, and if he is not happy with anything, he can select a new style effect which replaces the preceding one, or modify or eliminate the style effect.

It is also possible to produce the garment by operations for cutting parts out of a fabric, once these parts have been validated by simulation. Such a cut-out operation can be carried out using known methods and with known devices, for example as described in document U.S. Pat. No. 5,825,652.

Figure 16:
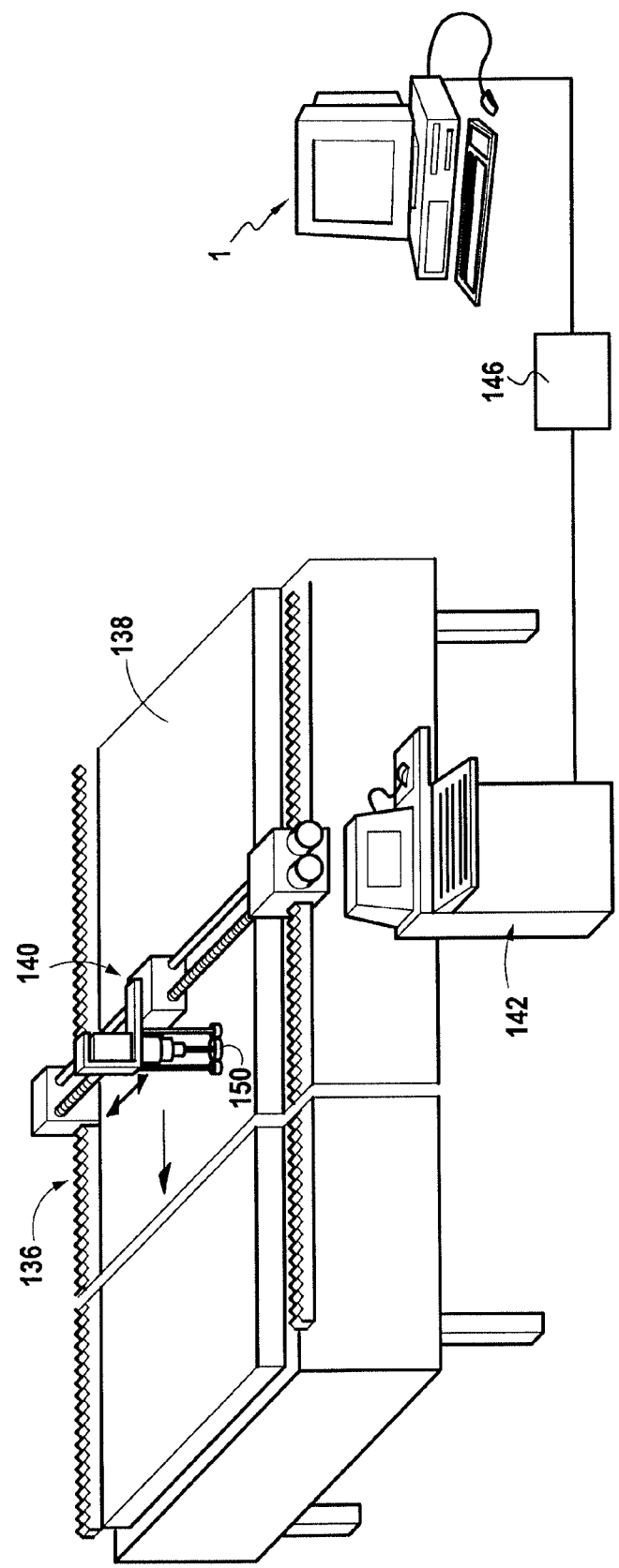
FIG. 16 illustrates a highly schematic example of a cut-out device connected to the device from FIG. 1.
Figure 17:
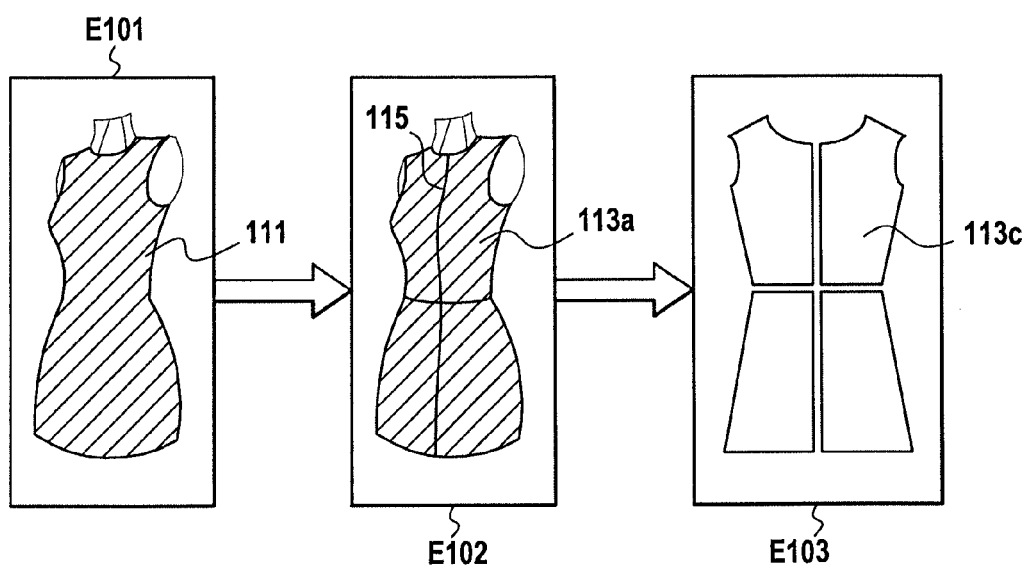
FIG. 17 is a flow chart illustrating the various steps of the design of a garment according to the prior art.

Such a device is illustrated in FIG. 16. It comprises a cut-out table 136, on which there can be positioned fabrics 138 to be cut out, means 140 for positioning and moving a cut-out tool 150, control means 142 and means 146 (for example a connection of a communication network or a storage medium) for transmitting data between the design device 1 and the means 142 for controlling the cut-out device.

The invention claimed is:

1. Method for a computer-aided design of a garment occupying a virtual surface represented by data stored in a memory of a computer, comprising the following steps:
generating base patterns on said virtual surface,
adding at least one style effect on at least one base pattern transforming said at least one base pattern into at least one stylised base pattern,
forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, and validating the insertion of the given supplementary surface on said virtual surface.

2. Method according to claim 1, further comprising a variation of said set of parameters to find the appropriate parameters for passing said validation test.

3. Method for a computer-aided design of a garment occupying a virtual surface represented by data stored in a memory of a computer, comprising the following steps,
generating base patterns on said virtual surface,
adding at least one style effect on at least one base pattern transforming said at least one base pattern into at least one stylised base pattern, and
forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, wherein the given supplementary surface and the given section are represented by a set of parameters and wherein the set of parameters is defined in a declarative manner allowing a resolution means to carry out the necessary calculations for the insertion of said given supplementary surface, wherein said given section is selected from a set of sections comprising a dart section, an internal section, and an I-shaped section.

4. Device for designing a garment occupying a virtual surface represented by data stored in storage means, comprising processing means, for:

generating base patterns on said virtual surface, adding at least one style effect on at least one base pattern transforming said at least one base pattern into at least one stylised base pattern, and forming a stylised virtual surface, and in that said processing means add a style effect on a base pattern by inserting a given supplementary surface into a given section of said base pattern, wherein said processing means selects said given section from a pre-established database of given sections comprising: dart sections, internal sections, and I-shaped sections.

5. Device for producing garment items, comprising:

a device for designing a garment occupying a virtual surface., comprising processing means, for:

generating base patterns on said virtual surface, adding at least one style effect on at least one base pattern transforming said at least one base pattern into at least one stylised base pattern, and forming a stylised virtual surface, and in that said processing means add a style effect on a base pattern by inserting a given supplementary surface into a given section of said base pattern, said base pattern corresponding to a closed arc path of a planar graph associated with said virtual surface, and said given section corresponding to a pair of vertices pertaining to said planar graph, conducting a test validating the insertion of the given supplementary surface on said virtual surface, and converting said base pattern to a flat pattern by means of a laying-flat method, cutting means for cutting out garment items based on the flat pattern, and means for transmitting data between the design device and the cutting means.

6. Computer system including a program of coded instructions for carrying out a method stored within a non-transitory storage means, the method comprising the following steps:

generating base patterns on a virtual surface, adding at least one style effect on at least one base pattern transforming said at least one base pattern into at least one stylised base pattern, and forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, wherein the given supplementary surface and the given section are represented by a set of parameters and wherein the set of parameters is defined in a declarative manner allowing a resolution means to carry out the necessary calculations for the insertion of said given supplementary surface.

7. Non-transitory data medium which is readable by a computer system, comprising data or instructions for carrying out a method comprising the following steps:

generating base patterns on a virtual surface, adding at least one style effect on at least one base pattern transforming said at least one base pattern into at least one stylised base pattern, and forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, wherein the given supplementary surface and the given section are represented by a set parameters and wherein the set of parameters is defined in a declarative manner allowing a resolution means to carry out the necessary calculations for the insertion of said given supplementary surface.

8. Method for a computer-aided design of a garment occupying a virtual surface represented by data stored in a memory of a computer, comprising the following steps:

generating base patterns on said virtual surface, adding at least one style effect on at least one base pattern transforming said at least one base pattern into at least one stylised base pattern, and forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, wherein the given supplementary surface and the given section are represented by a set of parameters and wherein the set of parameters is defined in a declarative manner allowing a resolution means to carry out the necessary calculations for the insertion of said given supplementary surface.

9. Method according to claim 8, further comprising an elimination, a replacement, or a modification of at least one style effect on a stylised base pattern by an elimination, a replacement, or a modification of said given supplementary surface.

10. Method according to claim 8, wherein the set of parameters is defined in a procedural manner based on a flow chart indicating step-by-step the progress of the insertion of the given supplementary surface.

11. Method according to claim 8, wherein said given supplementary surface is selected from a set of supplementary surfaces comprising a dart surface, a flare surface, a flounce surface, a gore surface, a pleat surface, and a gathered surface.

12. Method according to claim 8, wherein the base patterns are three-dimensional base patterns defined by stitchlines on said virtual surface and said at least one stylised base pattern is a three-dimensional stylised base pattern defined on said stylised virtual surface.

13. Method according to claim 12, wherein after the formation of said stylised virtual surface, the method includes laying said three-dimensional base patterns flat to form flat patterns reproducing said stylised virtual surface.

14. Method according to claim 8, further comprising a test validating the insertion of the given supplementary surface on said virtual surface.

15. Method according to claim 14, further comprising a variation of said set of parameters to find the appropriate parameters for passing said validation test.

16. Method according to claim 8, wherein said given section is selected from a set of sections comprising a dart section, an internal section, and an I-shaped section.

17. Method for a computer-aided design of a garment occupying a virtual surface represented by data stored in a memory of a computer, comprising the following steps:
- generating base patterns on said virtual surface,
- adding at least one style effect on at least one base pattern transforming said at least one base pattern into at least one stylised base pattern,
- forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, and
- conducting a test validating the insertion of the given supplementary surface on said virtual surface.

18. Method for a computer-aided design of a garment occupying a virtual surface represented by data stored in a memory of a computer, comprising the following steps:
- generating base patterns on said virtual surface,
- adding at least one style effect on at least one base pattern transforming said at least one base pattern into at least one stylised base pattern, and
- forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, wherein said given section is selected from a set of sections comprising a dart section, an internal section, and an I-shaped section.

19. Device for designing a garment occupying a virtual surface represented by data stored in storage means, comprising processing means, for:
- generating base patterns on said virtual surface,
- adding at least one style effect on at least one base pattern transforming said at least one base pattern into at least one stylised base pattern,
- forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, and
- conducting a test validating the insertion of the given supplementary surface on said virtual surface.

20. Device according to claim 19, wherein said processing means selects said given supplementary surface from a pre-established supplementary surfaces database comprising: dart surfaces, flare surfaces, flounce surfaces, gore surfaces, pleat surfaces, and gathered surfaces.

21. Device according to claim 19, wherein the base patterns are three-dimensional base patterns defined by stitch lines on said virtual surface and said at least one stylised base pattern is a three-dimensional stylised base pattern defined on said stylised virtual surface.

22. Device according to claim 19, wherein said processing means are furthermore intended to form flat patterns capable of reproducing said stylised virtual surface by laying said three-dimensional base patterns flat.

23. Device according to claim 19, wherein said processing means selects said given section from a pre-established database of given sections comprising: dart sections, internal sections, and I-shaped sections.

24. Device for designing a garment occupying a virtual surface represented by data stored in storage means, comprising processing means, for:
- generating base patterns on said virtual surface,
- adding at least one style effect on at least one base pattern transforming said at least one base pattern into at least one stylised base pattern, and
- forming a stylised virtual surface, wherein the addition of a style effect on a base pattern comprises the insertion of a given supplementary surface into a given section of said base pattern, said base pattern corresponding to a closed arc path of a planar graph associated with said virtual surface, and said given section corresponding to a pair of vertices pertaining to said planar graph, wherein said given section is selected from a set of sections comprising a dart section, an internal section, and an I-shaped section.

\* \* \* \* \*